UNITED STATES PATENT OFFICE.

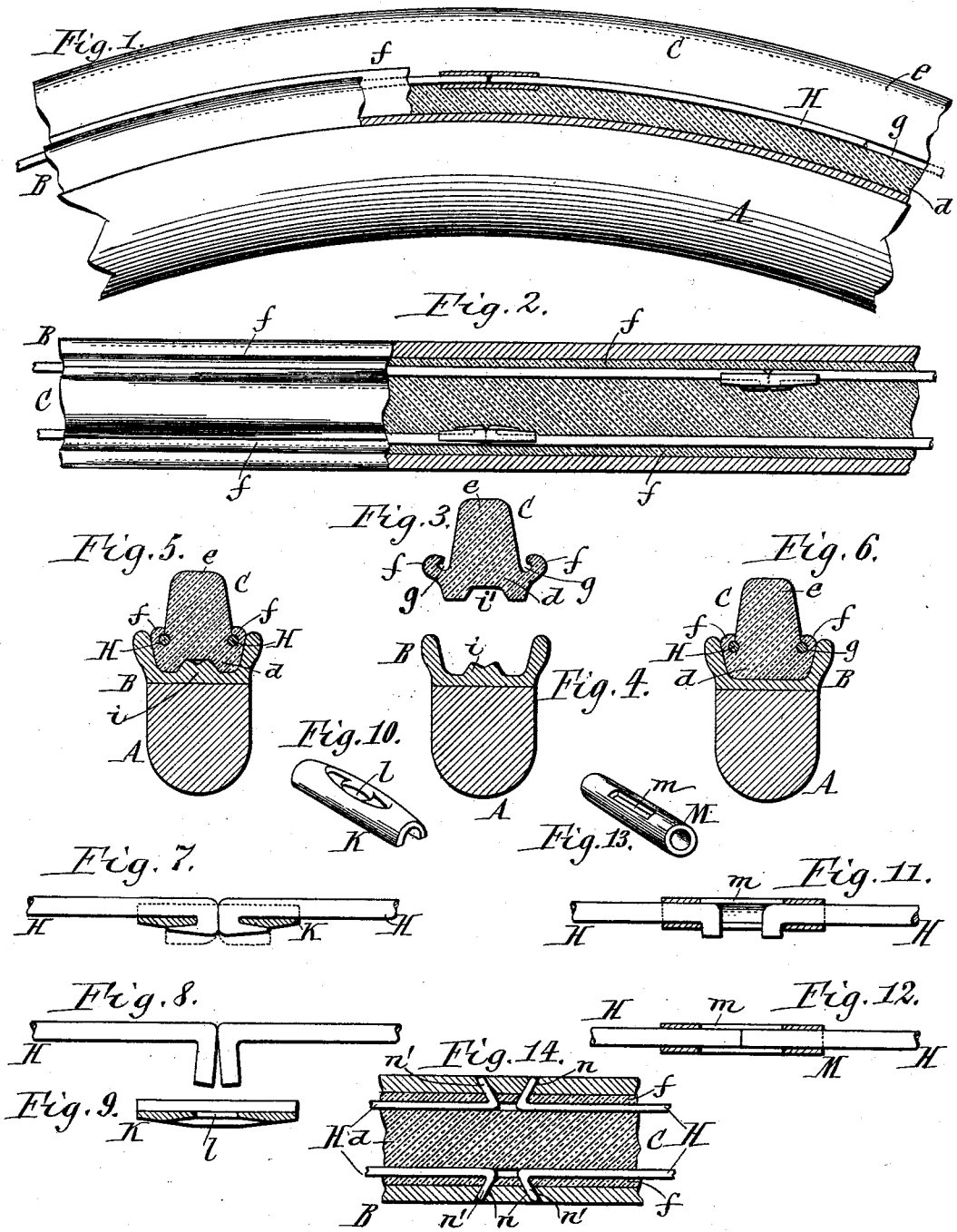

JOHN M. SWEET, OF BATAVIA, NEW YORK, ASSIGNOR TO FRANK RICHARDSON, TRUSTEE, OF SAME PLACE.

TIRE FOR VEHICLE-WHEELS.

SPECIFICATION forming part of Letters Patent No. 636,931, dated November 14, 1899.

Application filed April 5, 1899. Serial No. 711,780. (No model.)

*To all whom it may concern:*

Be it known that I, JOHN M. SWEET, a citizen of the United States, residing at Batavia, in the county of Genesee and State of New York, have invented new and useful Improvements in Tires for Vehicle-Wheels, of which the following is a specification.

This invention relates to that class of rubber tires for vehicle-wheels which are composed of a base by which the tire rests in the channel of the wheel-rim and of a tread which projects outwardly from the base and which may be either continuous or composed of a circular series of separate projections. These tires are sometimes secured in the channel of the wheel-rim by fastening-wires, which are arranged in annular grooves formed in the outer side of the base of the tire at the junction of the base and the tread.

The object of this invention is mainly to so construct the tire that the fastening-wires are enveloped by the outer portions of the base when the latter has been drawn by the wires into the channel and that the base is crowded into the channel in such manner that it fits tightly against the sides of the channel, thereby preventing sand and other solid matter from working under the tire and impairing the same.

In the accompanying drawings, Figure 1 is a side elevation, partly in longitudinal section, of a portion of a wheel-rim provided with my improvements. Fig. 2 is a top plan view, partly in section. Fig. 3 is a cross-section showing the tire before it is fastened to the wheel-rim. Fig. 4 is a coss-section of the wooden felly and the channeled rim secured to the face thereof. Fig. 5 is a cross-section showing the tire secured in the channeled rim. Fig. 6 is a similar view showing the channeled rim with a plain bottom. Fig. 7 is a horizontal section, on an enlarged scale, of the meeting ends of one of the wires and the plate connecting the same. Fig. 8 is a top plan view of the meeting ends of the wires. Fig. 9 is a longitudinal horizontal section of the connecting-plate. Fig. 10 is a perspective view of the connecting-plate. Fig. 11 is a horizontal section of the meeting ends of two fastening-wires connected by a sleeve. Fig. 12 is a similar view showing the ends of the wires before they are bent. Fig. 13 is a perspective view of the connecting-sleeve. Fig. 14 is a top plan view of the channeled rim and tire, partly in horizontal section, showing the wires provided with outwardly-bent ends which engage in openings formed in the side flanges of the channeled rim.

Like letters of reference refer to like parts in the several figures.

A represents the wooden felly of a vehicle-wheel; B, the channeled rim, of iron or steel, which is applied to the outer side of the felly, and C the rubber tire, which is arranged in the channel of the rim.

The tire consists of a base $d$ and a tread $e$, which is somewhat narrower than the base and may be continuous, as shown in Fig. 1, or composed of a circular series of projections, as may be preferred.

The base $d$ has inwardly-tapering sides which are designed to fit snugly between the inwardly-converging sides of the channeled rim. The base is provided at the outer corners of its sides with extensions, ears, or lips $f$, which project laterally, upwardly, and inwardly, having approximately a cross-section of hook shape, turned with its free end upwardly and inwardly, as represented in Fig. 3. The groove $g$ between the inner side of each lip $f$ and the side of the tread receives the fastening-wire H, which encircles the base and is drawn tightly against the same and secured after the tire has been placed in the channel of the rim. Before the tire is fully inserted into the channel the side lips $f$ project outwardly beyond the side flanges of the channel. The fastening-wires are now placed in the grooves between the lips and the sides of the tread, and their meeting ends are drawn tightly together by suitable appliances—for instance, screw-clamps—and are secured together. The pressure of the wires upon the base of the tire draws the base against the bottom of the channel. In being so drawn down into the channel the side lips $f$ are crowded into the channel and are also closed over the wires, as represented in Fig. 5. This causes an exceedingly-tight fit of the base between the side flanges of the channeled rim, which renders it impossible for sand, &c., to work under the tire and also protects the wires.

The bottom of the channel may be provided with a longitudinal central rib $i$, in which case the base of the tire has a corresponding groove $i'$, or the bottom may be plain, as shown in Fig. 6. The rib $i$ may have a central tapering depression in its outer or top surface, as shown, for centering the drill in boring holes through the rib and bottom of the channel.

The meeting ends of the fastening-wires can be secured together in various ways. As shown in Figs. 1, 2, 7, 8, 9, and 10, the meeting ends are connected by a concave or channeled plate K, which is placed against the inner sides of the meeting ends of the wires H and which is provided at its middle with an elongated opening $l$. Both meeting ends are bent inwardly through this opening and clenched and flattened against the inner side of the plate, whereby the ends of the wires are firmly secured together. As shown in Figs. 11, 12, and 13, the meeting ends of each wire are secured to a connecting-sleeve M, which is provided at its middle with an elongated mortise $m$ and at each end with a central opening through which the end of a wire can be inserted. When the ends of the wire have been inserted into this sleeve from opposite sides until they meet in the mortise, they are bent outward by a suitable tool, as shown in Fig. 11, thereby securing both wires to the sleeve. As shown in Fig. 14, each side flange of the channeled rim B is provided with two openings $n$, through which the ends $n'$ of the adjacent fastening-wire are bent, thereby securing the wire directly to the channeled rim. The lips $f$ of the base portion of the tire are in this case provided with openings, which allow the bent ends $n'$ of the wire to be passed outward and through the openings of the rim. The operation of fastening the wires by any of these means can be performed by ordinary tools and by workmen of ordinary skill. The tire is by this means fastened to the wheel in a very simple and reliable manner and can be easily taken off when it is necessary to renew the tire or a portion of the same.

I claim as my invention—

The combination with a channeled wheel-rim having inwardly-converging beveled sides, of a solid elastic rim composed of a base portion which is seated between the beveled sides of the channel and a tread portion which is narrower than the base portion, said tire being provided on each side, at the junction of the base portion and tread, with a circumferential groove which is located within the sides of the wheel-rim and with a circumferential lip which projects from the base portion outwardly beyond said groove, and which, when unrestrained, projects laterally beyond the side of the channel, and fastening wires or rods which are arranged in said grooves behind said lips and which are covered by the outer portions of said lips when the base portion of the tire and its lips have been drawn into the channeled rim, substantially as set forth.

Witness my hand this 1st day of April, 1899.

JOHN M. SWEET.

Witnesses:
 EDWARD WILHELM,
 THEO. L. POPP.